(12) United States Patent
Yang

(10) Patent No.: US 9,007,171 B2
(45) Date of Patent: Apr. 14, 2015

(54) LOCK DEVICE WITH WIRELESS FUNCTION AND METHOD THEREOF

(71) Applicant: Yao-Kun Yang, Chang-Hua County (TW)

(72) Inventor: Yao-Kun Yang, Chang-Hua County (TW)

(*) Notice: Subject to any disclaimer, the term of this patent is extended or adjusted under 35 U.S.C. 154(b) by 77 days.

(21) Appl. No.: 13/956,370

(22) Filed: Aug. 1, 2013

(65) Prior Publication Data

US 2015/0033807 A1   Feb. 5, 2015

(51) Int. Cl.
*E05B 47/00* (2006.01)
*G06F 21/35* (2013.01)
*G05B 15/00* (2006.01)

(52) U.S. Cl.
CPC .............. *E05B 47/00* (2013.01); *G06F 21/35* (2013.01); *G05B 15/00* (2013.01)

(58) Field of Classification Search
CPC .. G06F 21/35; G06F 2221/2111; G05B 15/00

USPC ................ 340/5.73, 5.23, 5.1, 5.2, 5.21, 5.22
See application file for complete search history.

(56) References Cited

U.S. PATENT DOCUMENTS

| | | | |
|---|---|---|---|
| 6,728,351 B2* | 4/2004 | Ahlstrom et al. ........ 379/102.06 |
| 8,138,886 B1* | 3/2012 | Chang ........................... 340/5.73 |
| 2003/0179075 A1* | 9/2003 | Greenman ................. 340/5.54 |
| 2003/0231102 A1* | 12/2003 | Fisher ........................ 340/5.73 |
| 2007/0096870 A1* | 5/2007 | Fisher ........................ 340/5.53 |
| 2008/0246587 A1* | 10/2008 | Fisher ........................ 340/5.73 |
| 2009/0167488 A1* | 7/2009 | Hays et al. .................... 340/5.5 |
| 2010/0176919 A1* | 7/2010 | Myers et al. ................. 340/5.73 |
| 2013/0293351 A1* | 11/2013 | Kuenzi et al. ............... 340/5.73 |

* cited by examiner

*Primary Examiner* — Albert Wong

(57) ABSTRACT

A lock device with wireless function includes a body having an entry key set assembled on a surface thereof, the body having a processing unit, a wireless unit, a power supplier and a main board assembled therein, the main board electrically connected to the entry key set, the processing unit, the wireless unit and the power supplier. Therefore, a corresponding key is unnecessary for the user to unlock the body.

4 Claims, 7 Drawing Sheets

LOCK DEVICE WITH WIRELESS FUNCTION AND METHOD THEREOF

BACKGROUND OF THE INVENTION

1. Field of the Invention

The present invention relates to a lock device and a method thereof, and more particularly to a lock device with wireless function and a method thereof.

2. Description of Related Art

A conventional lock device comprises a body and a key corresponding to the body. The key is used to unlock the body. However, when the conventional lock device is assembled to a door of a house for sale, there is a disadvantage as following.

Usually, a house owner would entrust his (or her) house to an agent and the agent would further make arrangements with a buyer. If the buyer wants to visit the house at once, the agent would currently draw the key from the house owner, so as to unlock the door of the house. However, if the house owner is far from the house or is in a foreign country, the agent cannot currently draw the key from the house owner; as a result, the buyer can only visit the house next time. Therefore, the agent might miss a chance to make a deal with the buyer, because the buyer might further visit other houses entrusted to other agents.

The present invention has arisen to mitigate and/or obviate the disadvantages of the conventional.

SUMMARY OF THE INVENTION

The main objective of the present invention is to provide an improved lock device.

To achieve the objective, a lock device with wireless function comprises a body having an entry key set assembled on a surface thereof, the body having a processing unit, a wireless unit, a power supplier and a main board assembled therein, the main board electrically connected to the entry key set, the processing unit, the wireless unit and the power supplier. Wherein, the body further has a memory unit electrically connected to the main board; the body further has a speaker electrically connected to the main board; the power supplier is a rechargeable lithium battery.

A method of the lock device with wireless function comprises the following processes:

registering process: a house owner registers information of a house on a network platform;

identifying process: an agent accesses the network platform via a smart handheld device and inputs a personal profile into the network platform; as a result, the network platform judges whether the personal profile of the agent satisfies certain conditions or not;

installing process: if the personal profile of the agent satisfies certain conditions, the network platform allows the agent to download an application program therefrom; as a result, the agent downloads the application program from the network platform and installs the application program into the smart handheld device thereof;

logining process: the agent logins into a web site of the network platform via the application program of the smart handheld device thereof;

coding process: the agent starts a visiting mode on the network platform; thereafter, the network platform sends a code to the smart handheld device of the agent, and simultaneously sends the code to the lock device via a wireless n-lite home router near the lock device;

unlocking process: the agent inputs the code into the lock device via an entry key set of the lock device; as a result, the lock device unlocks; and voiding process: after the agent locks the lock device, the network platform sends a voiding message to the lock device; as a result, the lock device is driven to void the code so as to prevent the code from being reused.

Wherein, the code is randomly defined; if the agent starts the visiting mode on the network platform, the network platform currently records who the agent is and when the agent starts the visiting mode on the network platform; the network platform records when the lock device unlocks; the house owner sets a visiting time on the network platform; as a result, when the lock device unlocks, the network platform starts to count time until the lock device is locked, and if the visiting time is over, the network platform sends a sounding message to the lock device so as to drive the lock device to give off sound until the lock device is locked.

Further benefits and advantages of the present invention will become apparent after a careful reading of the detailed description with appropriate reference to the accompanying drawings.

DETAILED DESCRIPTION OF THE INVENTION

Figure 1:
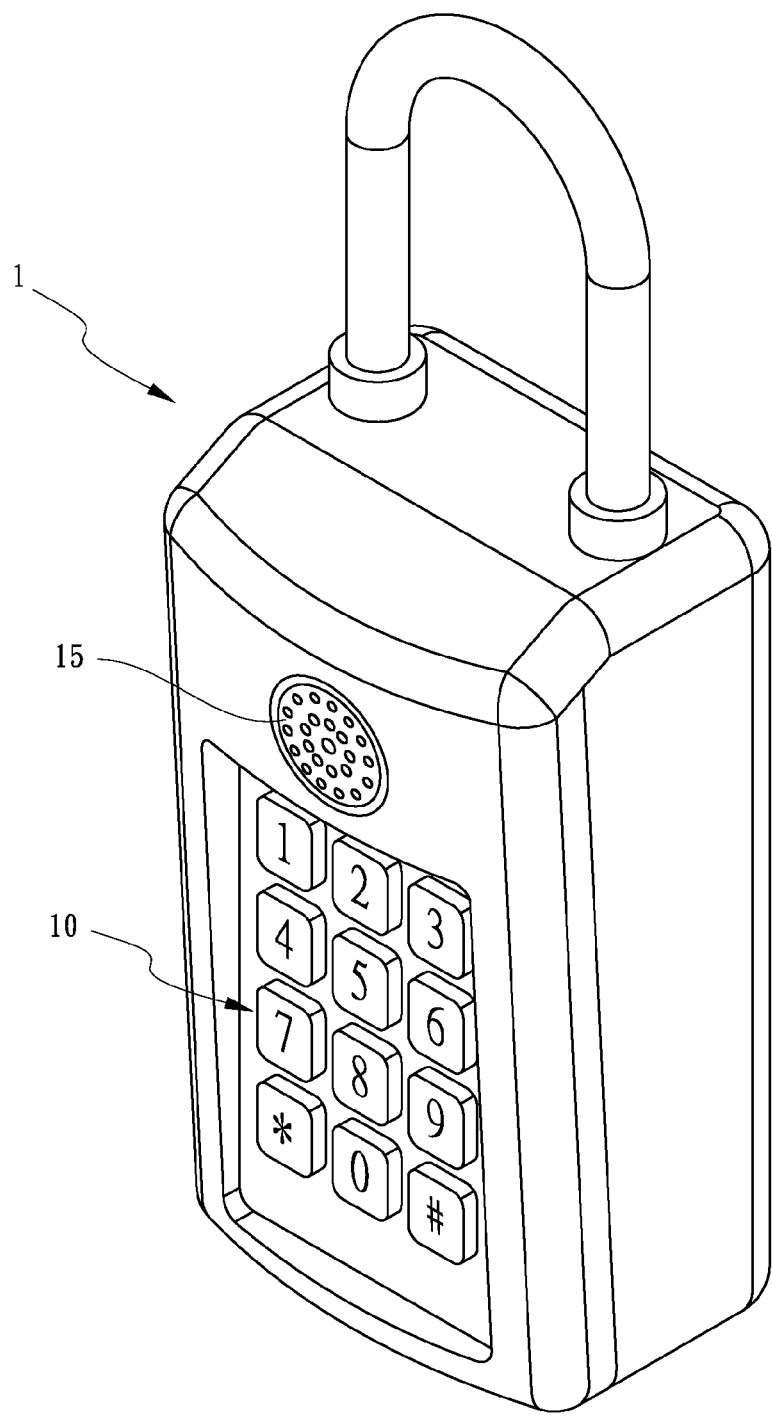
FIG. 1 is a perspective view of a lock device with wireless function of the present invention.
Figure 2:
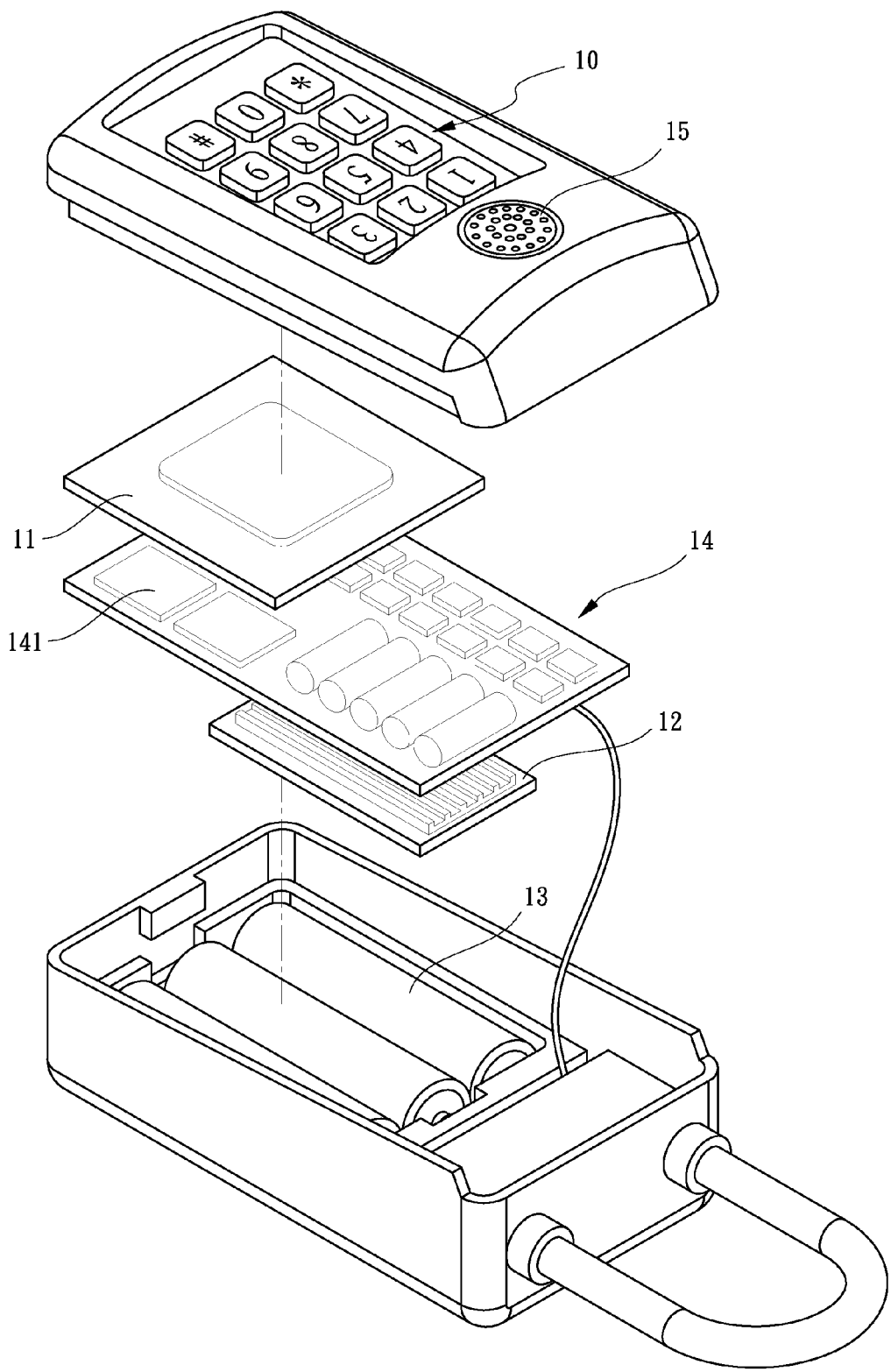
FIG. 2 is an exploded view of the lock device with wireless function.

Referring to FIGS. 1-2, a lock device with wireless function in accordance with the present invention comprises a body 1. The body 1 has an entry key set 10 assembled on a surface thereof. The body 1 has a processing unit 11, a wireless unit 12, a power supplier 13 and a main board 14 assembled therein. The main board 14 is electrically connected to the entry key set 10, the processing unit 11, the wireless unit 12 and the power supplier 13. The processing unit 11 is used to drive the body 1 to unlock. Under this arrangement, when the body 1 is turned on, the power supplier 13 supplies an electric power to the body 1; the body 1 is wirelessly connected to a network platform via the wireless unit 12; the network platform sends a locking condition to the body 1; if a user inputs a code which satisfies the locking condition into the body 1 via the entry key set 10, the processing unit 11 drives the body 1 to unlock. Therefore, a corresponding key is unnecessary for the user to unlock the body 1.

Referring to FIGS. 1-2, the body 1 further has a memory unit 141. The memory unit 141 is electrically connected to the main board 14. The memory unit 141 records something happening on the body 1 (e.g., who the user is and when the body 1 unlocks). The body 1 further has a speaker 15. The speaker 15 is electrically connected to the main board 14. The speaker 15 would be driven by the processing unit 11 to give off sound. The power supplier 13 is a rechargeable lithium battery.

Referring to FIGS. 3-7, a method of the lock device with wireless function of the present invention comprises the following processes.

Figure 5:
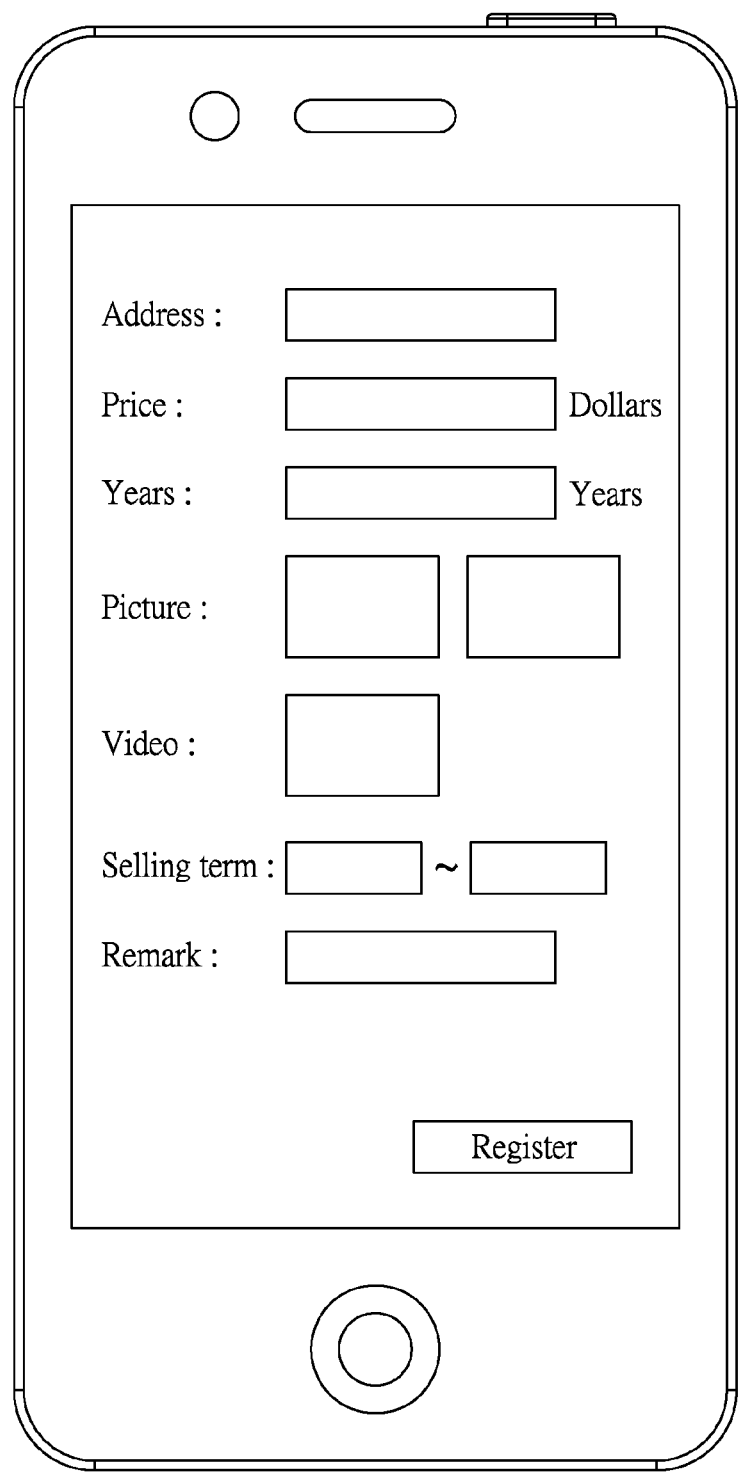
FIG. 5 is a diagram for showing a registering process.

Registering process 2: a house owner registers information of a house (as shown in FIG. 5; such as address, price, years, picture, video, selling term and remark) on a network platform.

Identifying process 20: an agent accesses the network platform via a smart handheld device and inputs a personal profile into the network platform; thereafter, the network platform judges whether the personal profile of the agent satisfies certain conditions or not; clearly, every agent has a license and the network platform judges whether the license is valid or not.

Installing process 21: if the personal profile of the agent satisfies certain conditions, the network platform allows the agent to download an application program therefrom; as a result, the agent downloads the application program from the network platform and installs the application program into the smart handheld device thereof.

Figure 6:
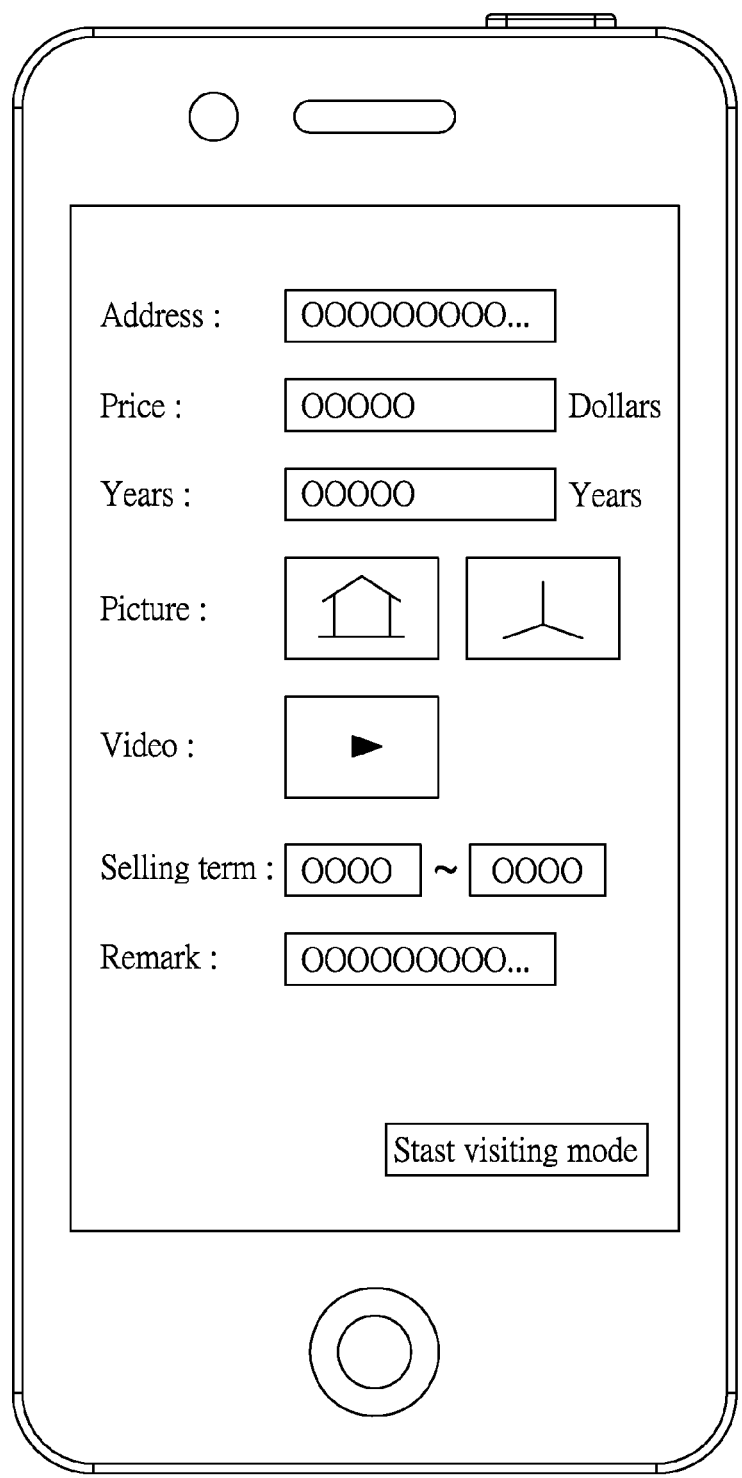
FIG. 6 is a diagram for showing a logining process.

Logining process 22: the agent logins into a web site of the network platform (as shown in FIG. 6) via the application program of the smart handheld device thereof.

Figure 3:
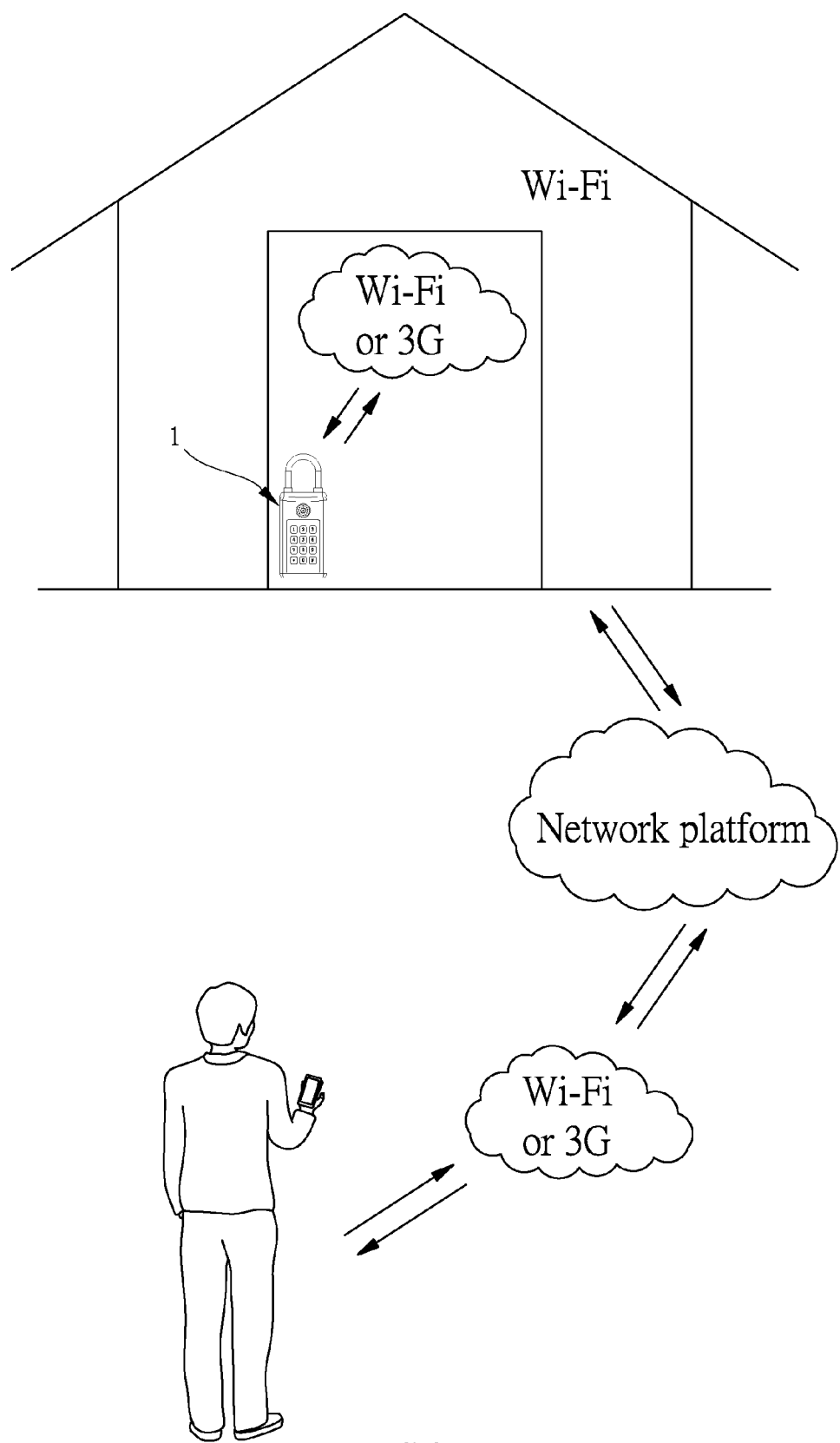
FIG. 3 is a diagram for showing a method of the lock device with wireless function.
Figure 4:
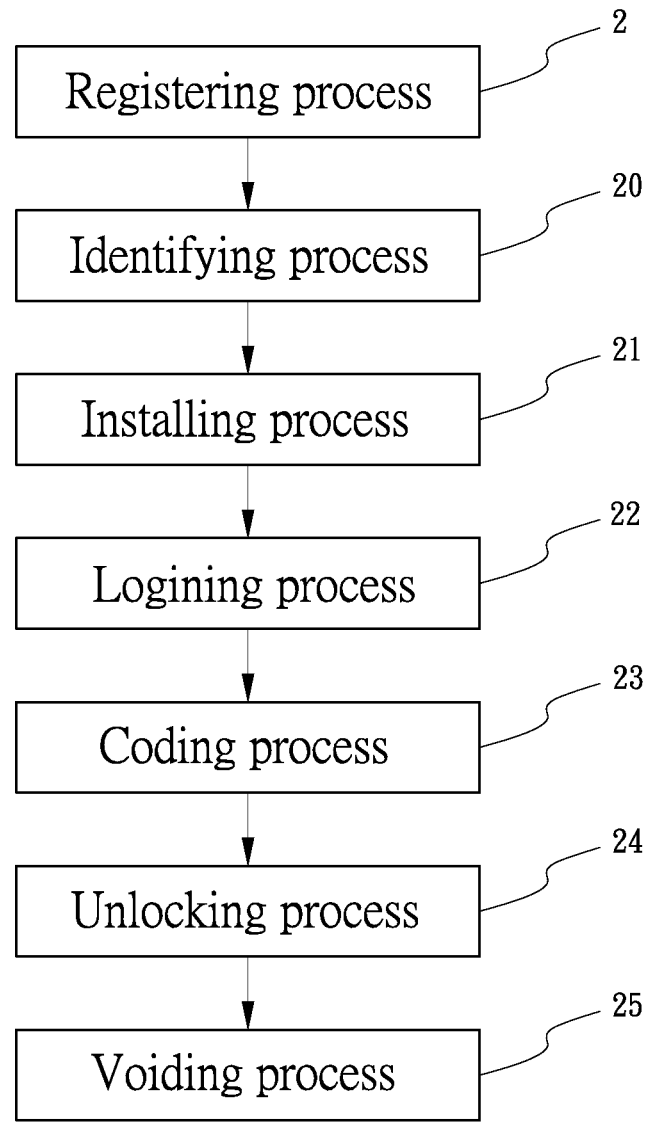
FIG. 4 is a flow chart for showing the method of the lock device with wireless function.
Figure 7:
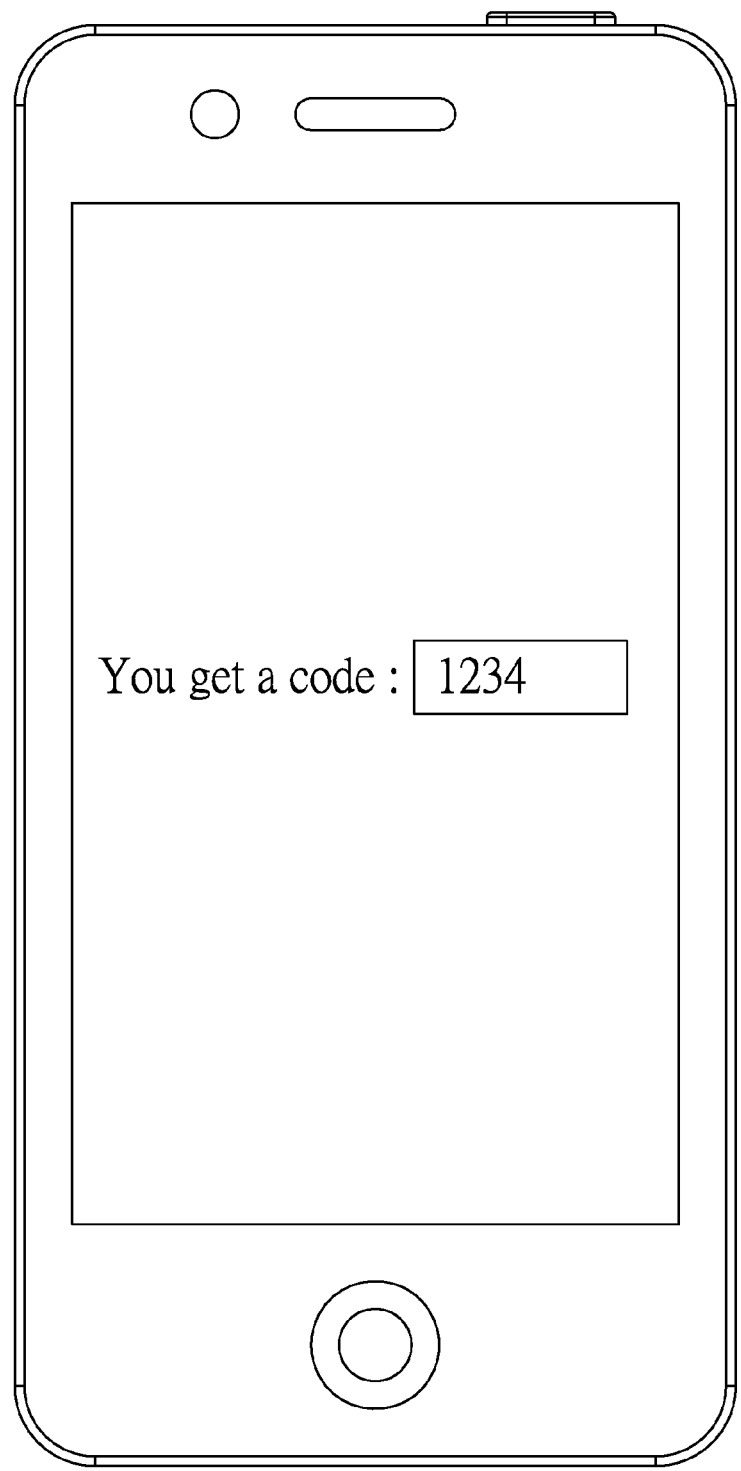
FIG. 7 is a diagram for showing a coding process.

Coding process 23: the agent starts a visiting mode on the network platform (as shown in FIG. 6); thereafter, the network platform sends a code to the smart handheld device of the agent (as shown in FIG. 7), and simultaneously sends the code to the lock device via a wireless n-lite home router near the lock device (as shown in FIG. 3); clearly, the code is randomly defined; in addition, if the agent starts the visiting mode on the network platform, the network platform currently records who the agent is and when the agent starts the visiting mode on the network platform.

Unlocking process 24: the agent inputs the code into the lock device via an entry key set of the lock device; as a result, the lock device unlocks; clearly, the network platform records when the lock device unlocks.

Voiding process 25: after the agent locks the lock device, the network platform sends a voiding message to the lock device; as a result, the lock device is driven to void the code so as to prevent the code from being reused.

Furthermore, the house owner sets a visiting time on the network platform; as a result, when the lock device unlocks, the network platform starts to count time until the lock device is locked, and if the visiting time is over, the network platform sends a sounding message to the lock device so as to drive the lock device to give off sound until the lock device is locked.

Although the invention has been explained in relation to its preferred embodiment, it is to be understood that many other possible modifications and variations can be made without departing from the spirit and scope of the invention as hereinafter claimed.

What is claimed is:

1. A method of the lock device with wireless function comprising the following processes:
    registering process: a house owner registers information of a house on a network platform;
    identifying process: an agent accesses the network platform via a smart handheld device and inputs a personal profile into the network platform; as a result, the network platform judges whether the personal profile of the agent satisfies certain conditions or not;
    installing process: if the personal profile of the agent satisfies certain conditions, the network platform allows the agent to download an application program therefrom; as a result, the agent downloads the application program from the network platform and installs the application program into the smart handheld device thereof;
    log-in process: the agent logs in a web site of the network platform via the application program of the smart handheld device thereof;
    coding process: the agent starts a visiting mode on the network platform;
    thereafter, the network platform sends a code to the smart handheld device of the agent, and simultaneously sends the code to the lock device via a wireless n-lite home router near the lock device;
    unlocking process: the agent inputs the code into the lock device via an entry key set of the lock device; as a result, the lock device unlocks; and
    voiding process: after the agent locks the lock device, the network platform sends a voiding message to the lock device; as a result, the lock device is driven to void the code so as to prevent the code from being reused.

2. The method as claimed in claim 1, wherein the code is randomly defined.

3. The method as claimed in claim 1, wherein if the agent starts the visiting mode on the network platform, the network platform currently records who the agent is and when the agent starts the visiting mode on the network platform; the network platform records when the lock device unlocks.

4. The method as claimed in claim 1, wherein the house owner sets a visiting time on the network platform; as a result, when the lock device unlocks, the network platform starts to count time until the lock device is locked, and if the visiting time is over, the network platform sends a sounding message to the lock device so as to drive the lock device to give off sound until the lock device is locked.

\* \* \* \* \*